ELECTRODYNAMIC VIBRATION PRODUCING APPARATUS

Filed Aug. 3, 1964

INVENTORS
Hugh W. Larsen, &
Carl E. Talaski
BY
Hugh L. Fisher
ATTORNEY

United States Patent Office 3,331,239
Patented July 18, 1967

3,331,239
ELECTRODYNAMIC VIBRATION PRODUCING
APPARATUS
Hugh W. Larsen and Carl E. Talaski, Milford, Mich.,
assignors to General Motors Corporation, Detroit,
Mich., a corporation of Delaware
Filed Aug. 3, 1964, Ser. No. 386,929
7 Claims. (Cl. 73—71.6)

ABSTRACT OF THE DISCLOSURE

Control system for an electrodynamic shaker table in which armature current circuits of opposite direction are alternately set up by alternate closing of switches in the circuits. The ratio of switch closure time is varied in accordance with a control signal representing desired displacement of the shaker table armature.

Summary of the invention

Figure 1:
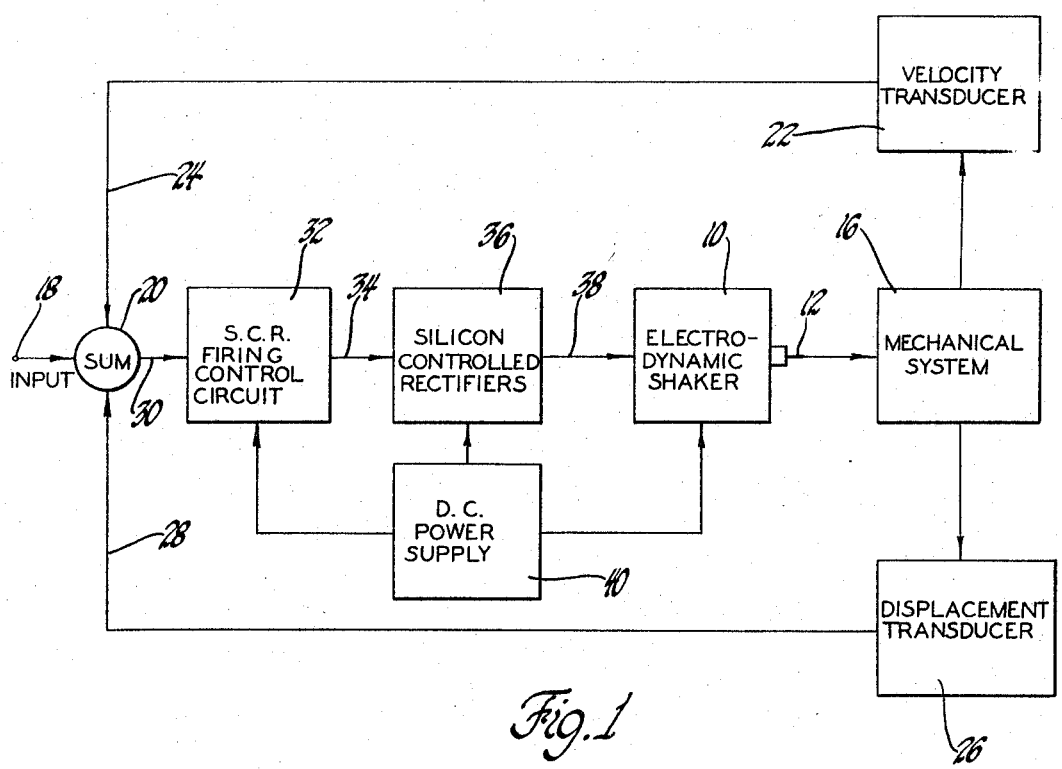

This invention relates to electrodynamic vibration producing apparatus and, more particularly, to means for regulating the armature excitation current thereof so as to produce a mechanical output which accurately follows a time-varying input signal.

It is often desirable to determine the effect of mechanical vibrations on a part or piece of equipment prior to actual use of the part or equipment. Such mechanical vibration testing may be accomplished through the use of an electrodynamic vibration producing apparatus having a displaceable member and an armature which is responsive to excitation current to produce a mechanical displacement of the member. In existing electrodynamic vibration systems a power amplifier supplies current to the armature of the device, which current is approximately proportional to an input control signal and the motion of the armature and, thus, is a function of the input signal and the characteristics of the mechanical system including the load to which the armature is connected. This results in displacements and forces which are not always proportional to the input signal, especially when it is of a highly complex character, and further the low end of the frequency over which the device is operable is limited such that operation cannot be accomplished at frequencies approaching zero.

According to the present invention, a vibratory mechanical output may be produced by an electrodynamic vibration producing apparatus which accurately and faithfully follows a time-varying input signal of a complex character. Further, the present invention allows operation of electrodynamic vibration producing apparatus over a wide frequency range of mechanical vibrations, which range extends to zero frequency.

In general, these advantageous results, and others which will become more apparent in the following description, are accomplished in an electrodynamic shaker having a displaceable member and an armature which is responsive to excitation current to produce a mechanical output via the member which is accurately related to the character of the excitation current. The invention includes a first energizing circuit connected to the armature and including a first switch means which may, for example, be a controlled rectifier operable to direct current through the armature in one direction. The invention further includes a second energizing circuit which is connected to the armature and including a second switch means which may also be a controlled rectifier operable to direct current through the armature in a direction opposite to that provided by the first switch means. The first and second energizing circuits are operable in an interdependent fashion such that only one switch means is closed at any one time thereby to provide a wide variation in the frequency of operation extending on the low frequency end all the way to zero. Control means for energizing circuits are provided including means for alternately operating the switch means to complete the two energizing circuits in an alternating fashion for respective time periods thereby to produce an average armature current which is variable in accordance with the ratio of the time period of energization of the two circuits. To vary this time ratio, the invention includes input means operatively associated with the control means and responsive to a time-varying input signal for varying the respective time periods of operation of the first and second switch means thereby to vary the average armature current in accordance with a desired vibration profile for the armature.

In a preferred form the invention includes at least one transducer means for generating a signal which represents the instantaneous displacement of the member and preferably additional transducer means for generating a signal representing the instantaneous velocity of the displaceable member. These signals are combined through feedback means with the time-varying waveform at the input point with the resulting difference being representative of an error between the actual performance of the mechanical member and the time-varying input signal. This resulting difference is, of course, applied to change the average armature current in a direction which reduces the error to zero.

Figure 2:
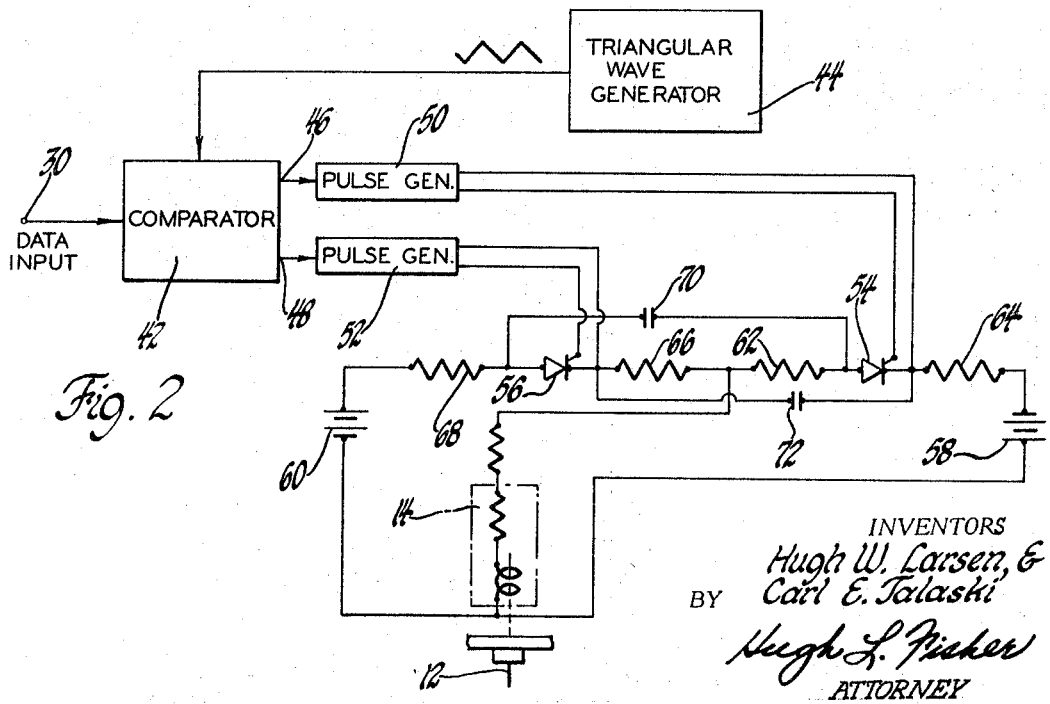

A full understanding of the invention may be best obtained through the description of an illustrative embodiment of the invention. Such a description is given in the following specification. The description is to be taken with the drawings of which:

FIGURE 1 is a block diagram of an electrodynamic vibration test apparatus employing the present invention; and, FIGURE 2 is a partly schematicized diagram of a control circuit and energizing circuits for the armature which may be used in implementing the present invention.

Referring now to FIGURE 1, there is shown in block diagram a system for controlling the operation of an electrodynamic shaker 10 in accordance with the objectives of the present invention. The electrodynamic shaker 10 is of a commercially available type which is well known to those skilled in the art as employing a displaceable output member 12 which is set into an oscillatory or vibratory motion by means of an armature 14 shown in FIGURE 2. The displaceable output member 12 is mechanically connected to a mechanical system 16 which is under test. The mechanical system 16 may, of course, take a variety of forms of which one example is an automobile suspension system.

The circuit shown in FIGURE 1 for controlling the particular characteristics of the vibratory motion of the output member 12 includes an input 18 for receiving an electrical signal waveform of a character which represents the manner in which the electrodynamic shaker 10 is to be controlled. Consistent with the above given example of an automobile suspension system for the mechanical system 16, the input waveform at 18 may be a complex voltage waveform representing the time-displacement curve of an automobile wheel moving over a road surface at high speed. This information may readily be provided by means of tape recording apparatus. Input 18 supplies one signal component to a summer 20 which also receives feedback signals from a velocity transducer 22 via an input line 24 and a displacement transducer 26 via an input line 28. Both the velocity transducer 22 and the displacement transducer 26 are interconnected with the mechanical system such that the signals presented to the summer 20 on lines 24 and 28 are representative of actual performance characteristics of the mechanical system 16 under the control of the electrodynamic shaker 10. Where the mechanical system 16 is a suspension system, the velocity transducer 22 may be a grounded type accelerometer and the displacement transducer 26 may be a simple potentiometer arrangement. As will be apparent to those skilled in the art, the combination shown in FIGURE 1, including the transducers 22 and 26 and input lines 24 and 28, constitutes a servo-control feedback loop in which the output of the summer 20 represents the signal waveform 18 as corrected by the signals from transducers 22 and 26.

The output 30 of the summer is connected to an SCR firing control circuit represented at 32. The firing control circuit 32 is responsive to the character of the signal appearing on output 30 of the summer 20 to provide electrical signals on a pair of outputs collectively represented at 34 which control the operation of a pair of silicon control rectifier switches collectively designated at 36. As is further described herein, the firing control circuit 32 is responsive to the signal on output 30 of summer 20 to operate the silicon control rectifier switches 36 in an alternating fashion to complete two energizing circuits collectively designated at 38 through the armature 14 of the electrodynamic shaker 10. In accordance with the desired time displacement characteristics of the output member 12 of the shaker 10 as represented by the complex waveform at 18, the energizing circuits including the silicon control rectifier switches 36 are completed for respective time periods which tend to produce an average armature current which is variable in accordance with the characteristics of the complex signal waveform at 18. A DC supply 40, shown in block form, supplies electrical energy to the firing control circuits 32, the silicon control rectifiers 36 and the electrodynamic shaker 10 in a manner which will become more apparent upon reading of the following description of the more detailed diagram of FIGURE 2.

Looking to FIGURE 2, the portion of the system of FIGURE 1, including the SCR firing control circuit 32, the silicon control rectifiers 36 and the electrodynamic shaker 10, is disclosed in greater detail. To perform the desired function of pulse duration modulation, a comparator 42 is provided to electrically compare the DC data input signal appearing at 30 with a constant frequency and amplitude triangular waveform which is produced by a triangular wave generator 44 which may comprise a free-running multivibrator producing a square wave which is integrated to obtain a triangular wave. It can be seen that by varying the DC level of a signal which is superimposed on a triangular waveform, the portion of the triangular waveform which exceeds a trigger level is also varied. By using the portion of the triangular waveform which exceeds the trigger level to operate pulse generators, for example, width modulated pulses may be conveniently produced.

Consistent with the brief introduction given immediately above, the data input signal appearing at 30 is compared at comparator 42 which may be, for example, a differential amplifier, with the signal which is produced by the triangular wave generator 44. The comparator 42 is a high gain device and is saturated in either the positive or negative direction transition to produce complementary signals at outputs 46 and 48 which change in condition as the sum of the triangular wave from generator 44 and the DC data input at 30 goes through zero.

The first output 46 is connected to a first pulse generator 50 and the second output 48 is connected to a second pulse generator 52. The pulse generators may take the form of monostable multivibrators which produce outputs only when the transition in the comparator 42 is from positive to negative in the half of the differential amplifier which corresponds to the particular pulse generator either 50 or 52.

The outputs of the pulse generator 50 and 52 are connected across the gate cathode circuits of a pair of silicon control rectifiers 54 and 56, respectively. As shown in FIGURE 2, SCR 54 is connected as a switch to control a first energizing circuit for armature 14 of the electrodynamic shaker 10, which circuit includes a DC source 58 having a polarity such that gating the SCR 54 produces current flow upwardly through the armature 14 as shown in the drawing. SCR 56 is connected in a second energizing circuit including a DC source 60 which produces current flow downwardly through armature 14 whenever SCR 56 is gated conductive by pulse generator 52. The energizing circuit including source 58 further includes a pair of resistors 62 and 64 which are connected in series with, and on opposite sides of, the SCR 54. The energizing circuit including source 60 also includes a pair of resistors 66 and 68 which are connected in series with, and on opposite sides of, the SCR 56. The circuit further includes a pair of cross-coupling capacitors 70 and 72 of which capacitor 70 is connected between the anodes of the SCR's 54 and 56 and the capacitor 72 is connected between the cathodes of the SCR's 54 and 56. These capacitors insure that whenever one of the SCR's 56 is rendered conductive the other is cut off.

The operation of the invention is believed to be apparent to those skilled in the art; however, a brief description thereof will be given in the following. A complex electrical waveform corresponding to the characteristics of displacement which are desired to be accurately and faithfully reproduced by the output member 12 of the electrodynamic shaker 10 are introduced on input 18. This signal is compared with electrical signals representing the instantaneous velocity and position of the mechanical system 16 as represented by transducers 22 and 26 to provide a sum or error signal on output 30. This signal is compared at 42 with a voltage of sloping waveform from triangle wave generator 44. Depending upon the relative amplitude at any instant of the DC signal at 30 and the triangular waveform from generator 44, either output 46 or 48 of the ocmparator 42 will be energized to produce an output from either pulse generator 50 or 52, respectively. Whichever pulse generator is active tends to gate conductive one of the SCR's 54 or 56 to apply DC current through armature 14 in a direction which corresponds with the result of the comparison made at comparator 42. This comparison is continuously made at the frequency of the triangular waveform from generator 46 to accurately and continuously vary the magnitude of the average armature current in accordance with the original input signal applied at 18. It should further be apparent to those skilled in the art that the circuit described in the specific embodiment above allows operation of the displaceable element 12 of the electrodynamic shaker 10 to be operated over an extremely broad frequency range, which range extends all the way to DC.

While the invention has been described with reference to the specific embodiment, it is to be understood that this description is not to be construed in a limiting sense inasmuch as various modifications and additions to the specific

What is claimed is:

1. Vibration test apparatus comprising: an electrodynamic shaker having a displaceable member and an armature responsive to excitation current to produce a mechanical displacement of the member related to the character of the excitation current, a first energizing circuit for the armature including first switch means operable to direct current in one direction through the armature thereby to produce mechanical output of a first character, a second energizing circuit for the armature including second switch means operable to direct current in the other direction through the armature thereby to produce a mechanical output of a second character, control means having an input for receiving a control signal and a pair of outputs for producing output signals which occur in alternating fashion, the ratio of the durations of the output signals varying in accordance with the value of the control signal, means connecting respective output signals to the first and second switch means for alternately operating the switch means for respective time periods, and means connected to the input of the control means and producing a control signal which varies in value in accordance with a desired vibration profile.

2. Vibration test apparatus comprising an electrodynamic shaker having a displaceable member and an armature responsive to excitation current to displace the member in accordance with the character of excitation current, a first energizing circuit connected to the armature and including first switch means operable to direct current through the armature in one direction, a second energizing circuit connected to the armature and including second switch means operable to direct current through the armature in the other direction, control means having an input for receiving a control signal and a pair of outputs for producing output signals which occur in alternating fashion, the ratio of the durations of the output signals varying in accordance with the value of the control signal, means connecting respective output signals to the first and second switch means for alternately operating the switch means for respective time periods thereby to produce an average armature current of predetermined value, means connected to the input of the control means and producing a control signal which varies in magnitude in accordance with a desired vibration profile, thereby to vary the average armature current according to the profile transducer means operatively associated with the displaceable member for producing displacement signals representng the character of displacement of the member, and feedback means for combining the displacement signals with the control signal thereby to vary the average current in accordance with the difference between said signals.

3. Vibration test apparatus comprising an electrodynamic shaker having a displaceable member and an armature responsive to excitation current to displace the member in accordance with the character of excitation current, a first energizing circuit connected to the armature and including first switch means operable to direct current through the armature in one direction, a second energizing circuit connected to the armature and including second switch means operable to direct current through the armature in the other direction, control means having an input for receiving a control signal and a pair of outputs for producing output signals which occur in alternating fashion, the ratio of the durations of the output signals varying in accordance with the value of the control signal, means connecting respective output signals to first and second switch means for alternately operating the switch means for respective time periods thereby to produce an average armature current of predetermined value, means connected to the input of the control means and responsive to an input signal of time-varying waveform for varying the respective time periods of operation of the first and second switch means thereby to vary the average armature current according to the waveform, first transducer means operatively associated with the displaceable member for producing a first displacement signal representing the instantaneous position of the member, second transducer means operatively associated with the displaceable member for producing a second displacement signal representing the instantaneous velocity of the member, and feedback means for combining the first and second displacement signals with the input signal to vary the average armature current in accordance with the sum of said signals.

4. Vibration test apparatus comprising an electrodynamic shaker having a displaceable member and an armature responsive to energizing current to displace the member in accordance with the character of the current, a first energizing circuit for the armature and including first rectifier means responsive to a control signal to direct current through the armature in one direction, a second energizing circuit for the armature and including second rectifier means responsive to a control signal to direct current through the armature in the other direction, control means including a source of a periodically alternating signal, means responsive to the relatively positive portions of the signals from the source for producing a first control signal, means responsive to the relatively negative portions of the signals from the source for producing a second control signal, the first and second rectifier means being connected to receive the first and second control signals respectively, and input means for comparing a time-varying signal with the alternating signals from said source to complementally vary the relatively positive and negative portions in accordance with the comparison thereby to modulate the first and second control signals to vary the average armature current according to the time-varying signal.

5. Apparatus as defined in claim 4 including transducer means mechanically connected to the displaceable member for producing a displacement signal representing the instantaneous displacement thereof and feedback means for combining the displacement signal with the time-varying waveform thereby to modulate the control signal such that the time-displacement characteristic of the displaceable member corresponds with the time-varying signal.

6. Apparatus as defined in claim 5 including transducer means mechanically connected to the displaceable member for producing a signal representing the instantaneous velocity thereof, and feedback means for combining the signal with the time-varying signal.

7. Vibration test apparatus comprising an electrodynamic shaker having a displaceable member and an armature responsive to energizing current to displace the member in accordance with the character of the current, a first energizing circuit including a first DC volatge source and a first controlled rectifier connected in series with the armature, a second energizing circuit including a second DC voltage source and a second controlled rectifier connected in series with the armature, the first and second rectifier being responsive to control signals to direct current through the armature in respectively opposite directions, control means including a source of a periodically alternating signal, means responsive to the relatively positive portions thereof to produce a first control signal, means responsive to the relatively negative portions thereof to produce a second control signal, the first and second controlled rectifiers being connected to receive the first and second control signals respectively, input means connected to receive a time-varying signal and to compare the signal to said alternating signal to vary the relatively positive and negative portions thereof in accordance with the comparison to modulate the first and second control signals thereby to vary the net armature current according to the time-varying signal, first transducer means mechanically connected to the displaceable member for producing a first displacement signal representing the instantaneous position of the member, second transducer means mechanically connected to the displaceable member for producing a second displacement signal representing the instantaneous velocity of the member, and feedback means for combining the first and second displacement signals with the time-varying signal for application to the control means thereby to control the displacements of the member.

References Cited

UNITED STATES PATENTS

| 2,287,223 | 6/1942 | Baird | 318—128 |
| 2,853,667 | 9/1958 | Booth et al. | |
| 2,955,460 | 10/1960 | Stevens et al. | 73—71.6 |
| 3,219,969 | 11/1965 | Snavely | 318—128 X |

RICHARD C. QUEISSER, *Primary Examiner.*

JOHN P. BEAUCHAMP, *Examiner.*